(12) United States Patent
Schybergson

(10) Patent No.: US 7,109,848 B2
(45) Date of Patent: Sep. 19, 2006

(54) APPLICATIONS AND METHODS FOR PROVIDING A REMINDER OR AN ALERT TO A DIGITAL MEDIA CAPTURE DEVICE

(75) Inventor: Olof Schybergson, London (GB)

(73) Assignee: Nokia Corporation, Espoo (FI)

( * ) Notice: Subject to any disclaimer, the term of this patent is extended or adjusted under 35 U.S.C. 154(b) by 273 days.

(21) Appl. No.: 10/715,094

(22) Filed: Nov. 17, 2003

(65) Prior Publication Data
US 2005/0105396 A1     May 19, 2005

(51) Int. Cl.
G08B 1/00 (2006.01)
(52) U.S. Cl. ............................ 340/309.7; 340/309.8; 368/12; 368/247
(58) Field of Classification Search ............ 340/309.8, 340/309.7, 309.16; 368/12, 247; 715/751; 708/112; 396/283, 286
See application file for complete search history.

(56) References Cited

U.S. PATENT DOCUMENTS

| | | | |
|---|---|---|---|
| 5,241,671 A | 8/1993 | Reed et al. | |
| 5,247,611 A | 9/1993 | Norden-Paul et al. | |
| 5,557,728 A | 9/1996 | Garrett et al. | |
| 5,633,678 A | 5/1997 | Parulski et al. | |
| 5,745,110 A | 4/1998 | Ertemalp | |
| 5,781,899 A | 7/1998 | Hirata | |
| 5,872,566 A | 2/1999 | Bates et al. | |
| 5,898,431 A | 4/1999 | Webster et al. | |
| 6,018,343 A * | 1/2000 | Wang et al. ................. | 715/733 |
| 6,023,241 A | 2/2000 | Clapper | |
| 6,085,205 A | 7/2000 | Peairs et al. | |
| 6,167,469 A | 12/2000 | Safai et al. | |
| 6,216,131 B1 | 4/2001 | Liu et al. | |
| 6,219,052 B1 | 4/2001 | Gould | |
| 6,256,162 B1 | 7/2001 | Matsumoto et al. | |
| 6,282,362 B1 | 8/2001 | Murphy et al. | |
| 6,301,586 B1 | 10/2001 | Yang et al. | |
| 6,304,881 B1 | 10/2001 | Halim et al. | |
| 6,330,568 B1 | 12/2001 | Boothby et al. | |
| 6,337,694 B1 | 1/2002 | Becker et al. | |
| 6,340,978 B1 | 1/2002 | Mindrum | |
| 6,345,274 B1 | 2/2002 | Zhu et al. | |
| 6,345,288 B1 | 2/2002 | Reed et al. | |
| 6,360,217 B1 * | 3/2002 | Gopal et al. .................... | 707/3 |
| 6,369,840 B1 * | 4/2002 | Barnett et al. .............. | 715/853 |

(Continued)

FOREIGN PATENT DOCUMENTS

EP     1 004 967 A1     5/2000

(Continued)

OTHER PUBLICATIONS

K. Priyantha Hewagamage, Masahito Hirakawa; *Augmented Album: Situation-dependent System for a Personal Digital Video/Image Collection*; 2000; pp. 323-326; 0-7803-6536-4/00; IEEE.

(Continued)

*Primary Examiner*—Anh V. La
(74) *Attorney, Agent, or Firm*—Alston & Bird LLP

(57) ABSTRACT

A notification system that reminds and/or alerts a digital media capture device that a media event that warrants capture is imminent. The notification system is implemented in conjunction with a digital planner such that event reminders are placed in the digital planner of a digital device and alerts are then sent to an associated digital media capture device proximate to the occurrence of the media event. The alerts may be sent to internal digital media capture devices or the alerts may be sent to external digital media capture devices that are remote from the device on which the digital planner is implemented.

45 Claims, 4 Drawing Sheets

U.S. PATENT DOCUMENTS

| | | |
|---|---|---|
| 6,373,507 B1 | 4/2002 | Camara et al. |
| 6,404,937 B1 | 6/2002 | Agata et al. |
| 6,405,218 B1 | 6/2002 | Boothby |
| 6,408,301 B1 | 6/2002 | Patton et al. |
| 6,411,724 B1 | 6/2002 | Vaithilingam et al. |
| 6,480,840 B1 | 11/2002 | Zhu et al. |
| 6,502,100 B1 | 12/2002 | Meyers |
| 6,532,480 B1 | 3/2003 | Boothby |
| 6,535,636 B1 | 3/2003 | Savakis et al. |
| 6,546,399 B1 | 4/2003 | Reed et al. |
| 6,600,510 B1 | 7/2003 | Parulski et al. |
| 6,629,100 B1 | 9/2003 | Morris et al. |
| 6,629,104 B1 | 9/2003 | Parulski et al. |
| 2001/0045964 A1 | 11/2001 | Camara et al. |
| 2001/0049275 A1 | 12/2001 | Pierry et al. |
| 2002/0054067 A1 | 5/2002 | Ludtke et al. |
| 2002/0059256 A1 | 5/2002 | Halim et al. |
| 2002/0063732 A1 | 5/2002 | Mansikkainiemi et al. |
| 2002/0075322 A1 | 6/2002 | Rosenzweig et al. |
| 2002/0075324 A1 | 6/2002 | Combs et al. |
| 2002/0075330 A1 | 6/2002 | Rosenzweig et al. |
| 2002/0076217 A1 | 6/2002 | Rodriguez et al. |
| 2002/0078070 A1 | 6/2002 | Eshelman et al. |
| 2002/0087546 A1 | 7/2002 | Slater et al. |
| 2002/0087601 A1 | 7/2002 | Anderson et al. |
| 2002/0122067 A1 | 9/2002 | Geigel et al. |
| 2002/0122071 A1 | 9/2002 | Camara et al. |
| 2002/0124004 A1 | 9/2002 | Reed et al. |
| 2002/0126158 A1 | 9/2002 | Camara et al. |
| 2002/0165751 A1 | 11/2002 | Upadhya |
| 2002/0188602 A1 | 12/2002 | Stubler et al. |
| 2003/0009469 A1 | 1/2003 | Platt et al. |
| 2003/0009493 A1 | 1/2003 | Parker et al. |
| 2003/0033296 A1 | 2/2003 | Rothmuller et al. |
| 2003/0051207 A1 | 3/2003 | Kobayashi et al. |
| 2003/0059112 A1 | 3/2003 | Loui et al. |
| 2003/0081145 A1 | 5/2003 | Seaman et al. |
| 2003/0083051 A1 | 5/2003 | Ntende |
| 2003/0110503 A1 | 6/2003 | Perkes |
| 2003/0115219 A1 | 6/2003 | Chadwick |
| 2003/0117498 A1 | 6/2003 | Cole et al. |
| 2003/0123737 A1 | 7/2003 | Mojsilovic et al. |
| 2003/0126212 A1 | 7/2003 | Morris et al. |
| 2003/0126603 A1 | 7/2003 | Kim et al. |
| 2003/0128389 A1 | 7/2003 | Matraszek et al. |
| 2003/0133017 A1 | 7/2003 | Mauro |
| 2003/0140034 A1 | 7/2003 | Probst et al. |
| 2003/0154178 A1 | 8/2003 | McIntyre et al. |
| 2003/0156202 A1 | 8/2003 | van Zoe |
| 2003/0161499 A1 | 8/2003 | Svendsen et al. |
| 2003/0163474 A1 | 8/2003 | Herz |
| 2003/0174893 A1 | 9/2003 | Sun et al. |
| 2003/0182170 A1 | 9/2003 | Meunitz |
| 2003/0187820 A1 | 10/2003 | Kohut et al. |
| 2003/0193582 A1 | 10/2003 | Kinio |
| 2003/0195883 A1 | 10/2003 | Mojsilovic et al. |
| 2003/0212993 A1 | 11/2003 | Obrador |
| 2003/0217118 A1 | 11/2003 | Kobayashi et al. |
| 2003/0220894 A1 | 11/2003 | Russon |
| 2004/0145602 A1 | 7/2004 | Sun |
| 2004/0153445 A1 | 8/2004 | Horvitz et al. |

FOREIGN PATENT DOCUMENTS

| | | |
|---|---|---|
| EP | 1051034 A1 | 11/2000 |
| EP | 1 182 585 A2 | 2/2002 |
| EP | 1 351 167 A2 | 10/2003 |
| GB | 2 379 116 A | 2/2003 |
| JP | 2003-87624 | 3/2003 |
| JP | 2003/209824 | 7/2003 |
| JP | 2003/303211 A | 10/2003 |
| WO | WO 9937075 A1 | 7/1999 |
| WO | WO 00/04726 | 1/2000 |
| WO | WO 01/28227 A1 | 4/2001 |
| WO | WO 01/63391 A2 | 8/2001 |
| WO | WO 02/27545 A2 | 4/2002 |
| WO | WO 02/057959 A2 | 7/2002 |
| WO | WO 02/086735 A1 | 10/2002 |
| WO | WO 03/083715 A1 | 10/2003 |

OTHER PUBLICATIONS

Masahito Hirakawa, Priyantha Hewagamage, Tado Ichikawa; *Situation-dependent Browser to Explore the Information Space*.

B. Schneiderman; *Designing the User Interface: Strategies for Effective Human-Computer Interaction*; 1992; pp. 510-549; Chapter 15; XP 002210867.

* cited by examiner

|  |  |  |
|---|---|---|
| Wednesday 19.6. | Thursday 20.6. | Friday 21.6. |
| 6:00 | 6:00 | 6:00 |
| 7:00 | 7:00 | 7:00 |
| 8:00 Dentist | 8:00 Sales Meeting | 8:00 Weekly Meeting |
| 9:00 Teleconf with Micron | 9:00 | 9:00 |
| 10:00 | 10:00 CRM workshop | 10:00 |
| 11:00 | 11:00 | 11:00 Lunch with Sue |
| TIME NOW 12:21 | 12:00 | 12:00 |
| 13:00 Factory Visit | 13:00 | 13:00 |
| 14:00 | 14:00 | 14:00 |
| 15:00 | 15:00 Football training | 15:00 Midsummer party |
| 16:00 | 16:00 | 16:00 |

FIG. 1

APPLICATIONS AND METHODS FOR PROVIDING A REMINDER OR AN ALERT TO A DIGITAL MEDIA CAPTURE DEVICE

FIELD OF THE INVENTION

The present invention relates to digital devices that capture media files and, more specifically, to methods, apparatus and systems for communicating alerts to media capture devices for the purpose of reminding the device that a media event, which warrants capturing, is imminent.

BACKGROUND OF THE INVENTION

The rapid growth of digital communication has made it possible for all kinds of digital media items to be communicated amongst various types of wireless and wire line communication devices. For instance, the cellular or mobile telephone is no longer limited to telephonic voice communication and may include other means of digital communication, such as digital networking (i.e., Internet communication, text messaging, and the like). In addition, an increasing number of cellular telephones and other mobile wireless communication devices, such as portable computers, personal data assistants (PDAs) and the like, are being integrated with other means of capturing or producing digital media, such as digital cameras, digital audio recorders, digital video recorders and the like. Technological advances have made it possible for other digital devices, such as digital cameras, digital video recorders, digital audio devices and the like to be equipped with means for digital communication. As more and more digital devices possess the capability to digitally communicate with one another and provide for digital media capture capabilities, the amount of digital media items that will be captured and communicated amongst these devices will increase at an alarming rate.

The users of digital devices that possess media capture capability will, all too often, miss an opportunity to capture a media event. This is typically the case when the user either forgets to bring the device to the media event, forgets that an event is about to occur or fails to recognize an event as one that warrants media capture. For example, people often forget to bring their cameras to sporting events, birthday celebrations, picnics and the like. Therefore, it would be highly advantageous if the users of such devices were reminded, just prior to the event, that the event warrants media capture.

Most digital communication devices, such as desktop or laptop computers, personal data assistants (PDAs) or the like either come equipped or can be configured by the user to implement a daily planner application. The daily planner allows the user to coordinate and manage their upcoming schedule of events by inputting event reminders in a digital calendar. The digital planner provides the unique benefit of sending the user electronic reminders, in the form of alarms or visual or audible messages, when an upcoming event is pending. The digital planner has proven to be a highly successful tool for the businessperson and, in most instances, has replaced the need for conventional hard copy or paper daily planers.

Therefore, the need exists to develop a mechanism and system for notifying digital media capture devices that an event is about to occur that warrants media capture. Such a system will lessen, and in most instances eliminate, the likelihood that a media capture event will occur without the event being captured in media. The desired system should be capable of both internal and external alerts, such that a digital capture device can remind itself that a media capture event is about to occur or a digital device can communicate a reminder/alert to other digital devices capable of media capture.

BRIEF SUMMARY OF THE INVENTION

The present invention discloses an application that provides for communication of event alarms and event reminders to digital media capture devices that notify the user of the device that an event warranting media capture is imminent. In this regard, the invention serves to make certain that all events that warrant or require media recordation are captured.

In one embodiment of the invention an application for communicating media event alerts to a digital device is provided. The application includes a computer readable storage medium having computer-readable program instructions embodied in the medium. The computer-readable program instructions include first instructions for generating a calendar view that represents time in calendar format and associates events with respective periods of time and second instructions for generating an event reminder that is displayed in the calendar view and provides for an event reminder to be communicated to the digital device prior to the event. The second instructions may additionally provide for generation of an event alert, in response to instructions of the event reminder, that is communicated to the digital device proximate the event. The communication of the event reminder and/or alert may be internally, to a self-contained media capture device, or external, to a remote media capture device. The event alert may take the form of a visual alert, such as a text message or blinking light or the event reminder and/or alert may take the form of an audible alert, such as a ring tone. In addition the computer-readable program instructions may include third instructions for generating a digital media diary that provides for digital display of a media view in unison with the display of the calendar view, wherein the media view provides access to digital media files and associates digital media files with a period of time.

In another embodiment of the invention a digital device is defined as including a processing unit that executes computer-readable program instructions for accessing media files. The computer-readable program instructions include first instructions for generating a calendar view that represents time in calendar format and associates events with respective periods of time, and second instructions for generating an event reminder that is displayed in the calendar view and provides for an event reminder to be communicated to the digital device prior to the event. The second instructions may additionally provide for generation of an event alert, in response to instructions of the event reminder, that is communicated to the digital device proximate the event. In addition the device will include a display in communication with the processing unit that presents a display of the calendar view and media event reminder. The digital device will typically be a device that includes a media capture device, such as a cellular phone equipped with a camera or the device may be a digital communication device, such as a cellular telephone, personal data assistant (PDA) or the like. The device may also comprise computer-readable program instructions for third instructions for generating a digital media diary that provides for digital display of a media view in unison with the display of the calendar view, wherein the media view provides access to digital media files and associates digital media files with a period of time.

The invention is also embodied in a method for alerting a digital capture device of a media event warranting media capture. The method includes the steps of inputting an event reminder in a planner application that is implemented on a digital apparatus, associating the planner application with one of more digital media capture devices and communicating an event alert from the digital apparatus to the one or more digital media capture devices proximate to the media event occurring. The step of associating the event reminder with the planner application may occur automatically upon inputting the event reminder in those instances in which the planner application is configured to be bonded to one specific digital media capture device. Additionally, the step of associating the event reminder with the planner application may occur by user input. The method may additionally include the step of activating, automatically, the one or more digital capture devices upon receipt of the event alert. In instances in which the planner application is employed in unison with a media diary the method may include the steps of converting the event reminder to metadata information and correlating the metadata information with a media file associated with the media event. The event reminder is converted to metadata information for the purpose of marrying up the metadata with the media file related to the event when the media diary application receives such a file.

Thus, the present invention provides for a notification system that reminds digital media capture devices that a media event that warrants capture is imminent. The notification system is implemented in conjunction with a digital planner such that event reminders are placed in the digital planner if a digital device and alerts are then sent to an associated digital media capture device prior to the occurrence of the media event. The alerts may be sent to internal digital media capture devices or the alerts may be sent to external digital media capture devices that are remote from the device on which the digital planner is implemented. Thus, the present invention eliminates, or lessens the likelihood, that media events will occur without the event being captured in some digital media form.

BRIEF DESCRIPTION OF THE DRAWINGS

Having thus described the invention in general terms, reference will now be made to the accompanying drawings, which are not necessarily drawn to scale, and wherein:

FIG. 1 is an illustration of a calendar view and media event reminders as displayed by a planner application, in accordance with an embodiment of the present invention.

Figure 2:
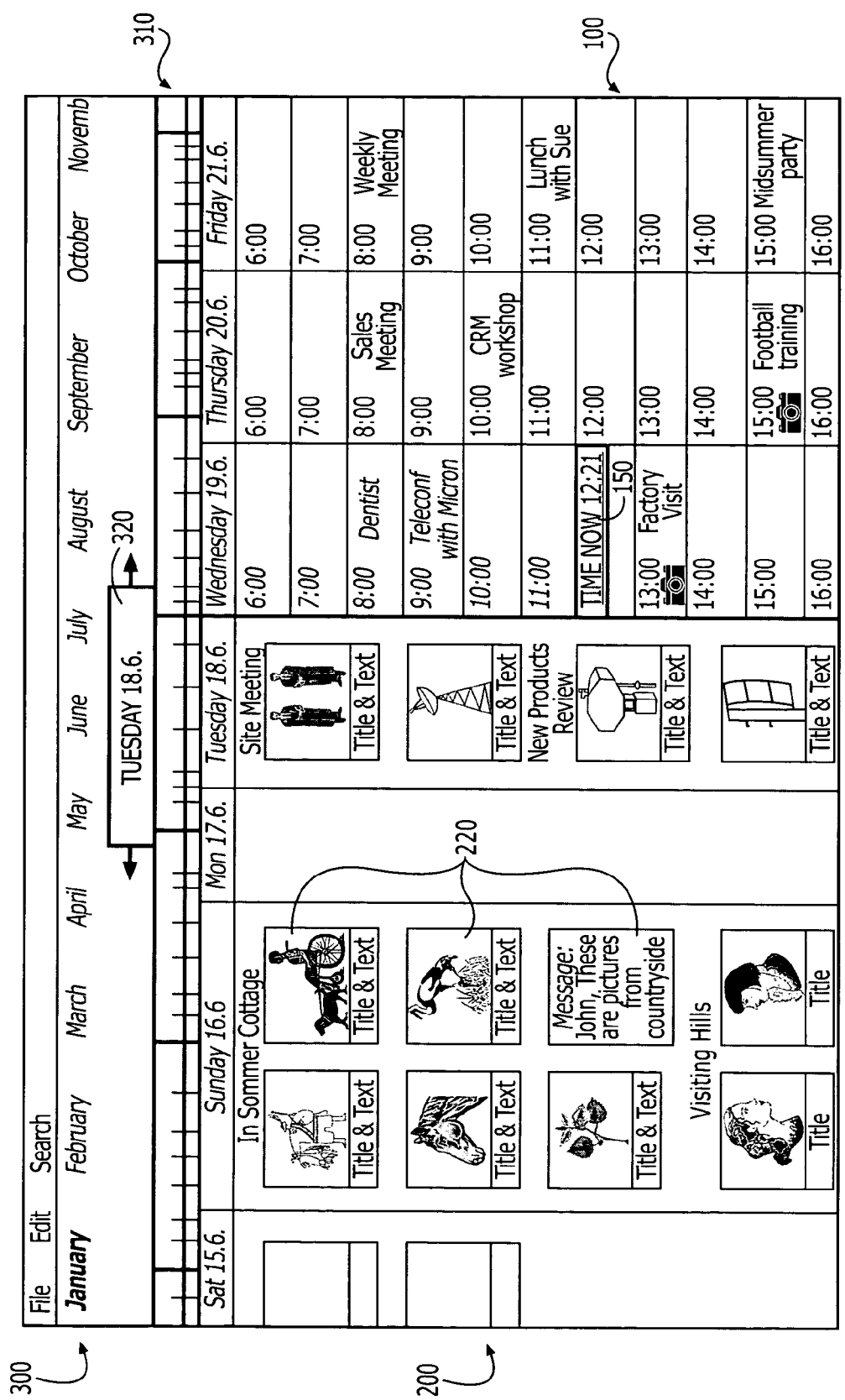
Figure 3:
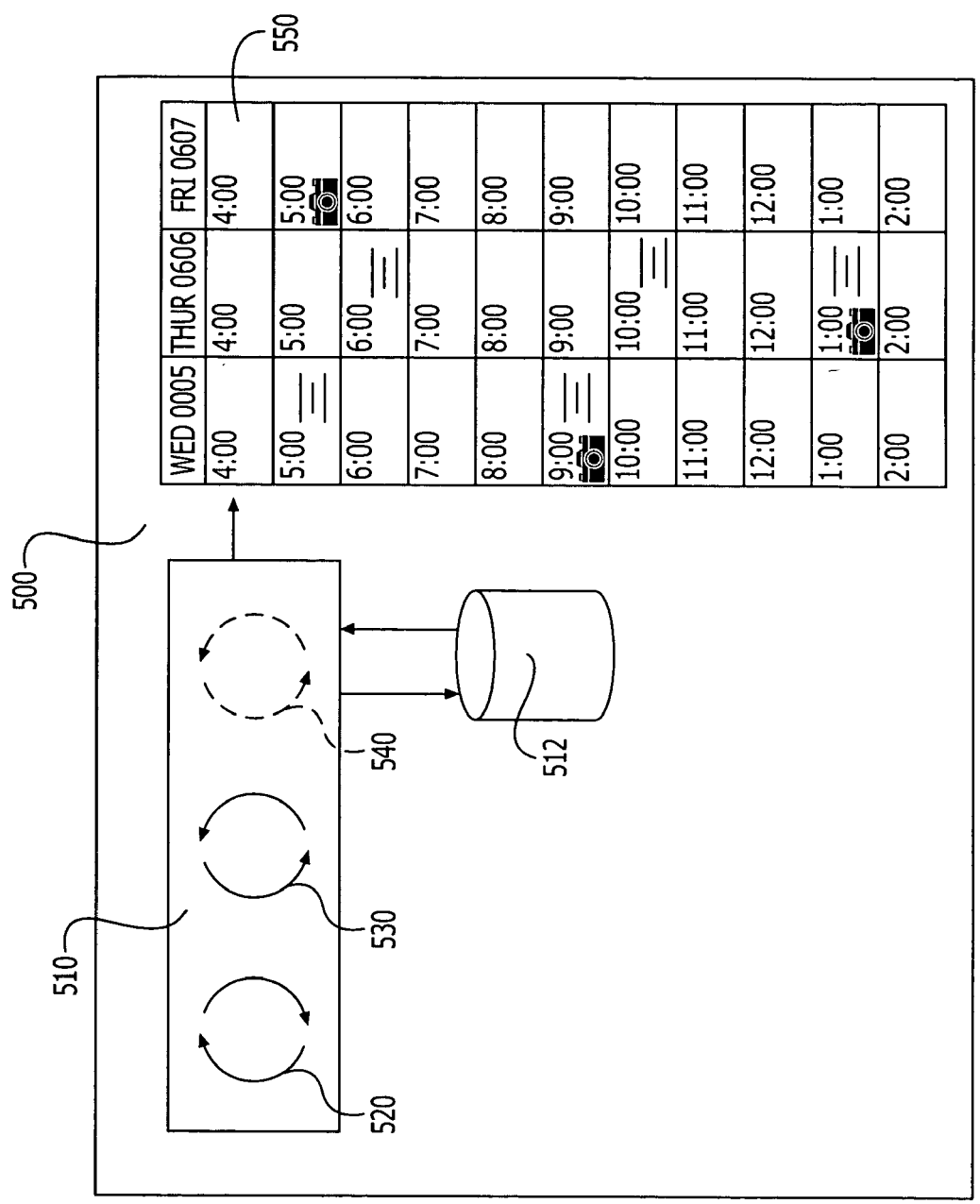

FIG. 2 is an illustration of a timeline view in combination with a media view and calendar view as implemented in a combined planner application and media diary application, in accordance with an embodiment of the present invention FIG. 3 is a block diagram of a digital device implementing a planner application capable of communicating event alerts and event reminders to media capture devices, in accordance with an embodiment of the present invention.

Figure 4:
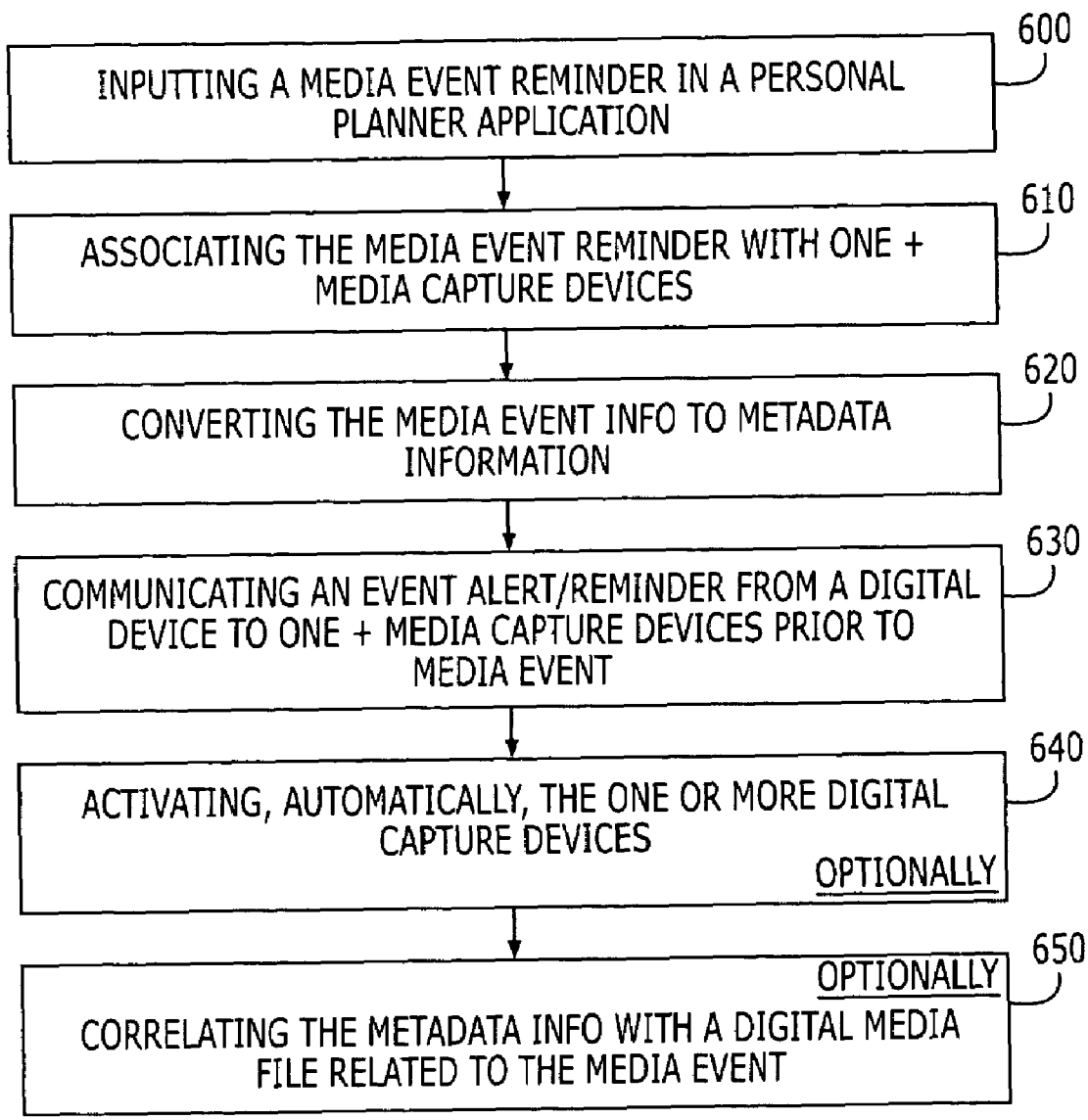

FIG. 4 is a flow diagram of a method for alerting and/or reminding a digital capture device of a media event warranting media capture, in accordance with an embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention is defined by a digital planner application that provides for event reminders and/or alerts to be communicated to digital capture devices. The digital planner application may take the form of a digital calendar, digital media file manager or media diary that allows the user to input notes and events associated with specific dates. The digital planner application is typically implemented on a digital device having an associated display, such that, the device is capable of displaying the calendar, along with calendared events and media event reminders. The digital planner may be a digital personal planner for personal use or a digital family/group planner designated for multiple users. Personal and multiple user features may be combined in the same digital planner application. In the multiple user embodiments, access is typically administered by input of user identifications and passwords.

The media capture alerts or reminders are associated with user-specified media capture events and provide the receiving digital capture device with notification that an event warranting media capture is about to occur. For example, the user of the digital planner will identify an event as requiring media capture. The event may be a birthday party, a football game or any other event that warrants image capture, video capture, audio capture or any other form of media capture. Once the user of the digital planner has identified such an event, the user will input an event reminder, commonly referred to as a media event reminder, into the digital planner application. The media event reminder will be visibly displayed on the device that implements the planner application and the event reminder will invoke communication of the event reminder to one or more associated media capture devices prior to the occurrence of the event. In addition, the media event reminder may be configured to communicate an event alert that is sent to one or more associated media capture devices proximate the occurrence of the event. While event reminders are communicated prior to the event, the event alerts are communicated proximate to the event, which is defined herein as upon the event occurring or immediately prior to the event.

In accordance with an embodiment of the present invention, the application for communicating event reminders will be embodied by a computer-readable storage medium having computer-readable program instructions stored in the medium. The storage medium will typically be a memory device, such as flash ROM memory, HDD or the like. The programming instructions may be written in a standard computer programming language, such as C++, Java or the like. Upon execution by a processing unit as described below, the program instructions will implement the various functions of the application as described below. The computer-readable program instructions include first instructions that will generate a calendar view that represents time in calendar format and associates events with respective periods of time. The computer-readable program instructions also includes second instructions that will generate an event reminder that is displayed in the calendar view and provides for communication to the digital device of the event reminder prior to the event. The second instructions may further generate an event alert in response to instructions of the event reminder and communicate the event alert to the digital device proximate the event. While the first and second instructions may be modules, objects or the like that communicate with one another, the first and second instructions need not be discrete or separable portions of the program instructions and may be interspersed throughout if so desired.

In one embodiment of the invention, the digital planner application is implemented on a device that captures media, such as a camera, video recorder, audio recorder or the like. In this embodiment the digital planner application is capable of internally communicating the event reminders and/or alerts to the internal media capture device for the purpose of reminding or alerting the user of the device that a media capture event is soon to occur in the near future or in the immediate future.

In an alternate embodiment of the invention, the digital planner application is implemented on a digital communication device, irrespective of the device's capability to capture media. In this embodiment the digital planner application is capable of externally communicating the event reminders and/or alerts to remote media capture devices that are capable of receiving communication for the purpose of reminding or alerting the user of the device that a media capture event is soon to occur in the near future or in the immediate future.

The event alerts may take on various forms depending either on user preference or device configuration. For example, the event alert may be an audible alert, in the form of a re-occurring sound that occurs at regular intervals up until the time of the event or the alert may be a visual alert, in the form of a text message on a display or a flashing visible indicator or the alert may be another sensory alert, such as a vibrating alert that alerts the user unobtrusively. In addition, the alert may provide for the media capture device to be automatically activated to begin the media capture process.

In one embodiment of the invention, the digital planner application may be configured such that it is associated or bonded to a predefined digital capture device. In this instance, the media event reminders are automatically associated with the bonded digital capture device, such that input of a media event reminder will trigger the communication of an event reminder and/or alert to the digital capture device prior to or at the occurrence of the event. This type of configuration is typical of devices in which the digital planner application is implemented in the same physical unit as the digital capture device. For an example, a cellular or mobile telephone having a self-contained digital image capture device would have the image capture device bonded to the digital planner application, such that all media event reminders would prompt reminders/alerts being communicated to the image capture device.

In alternate embodiments of the invention, the digital planner application may be configured such that the users can identify which digital capture device(s) they desire to associate or bond with a specific media event reminder. In this embodiment the event reminder/alert function of the planner application is not bound to any one specific digital capture device. For example, the user of the planner application may be able to choose one or more digital capture devices that it desires to associate with a media event reminder. In this example, the chosen digital capture devices will be sent an event alert prior to the occurrence of the event. The one or more digital capture devices may be chosen from a bonded list of such devices associated with the planner application or the device(s) may be identified by the user in conjunction with the creation of the media event reminder. This type of configuration is applicable of devices that implement the planner but do not incorporate an internal digital capture device. This type of configuration is also applicable of devices in which the digital planner application is implemented in the same physical unit as the digital capture device.

In embodiments of the invention, the chosen digital capture device will be sent the event reminder in advance of the occurrence of the event. For example, the event reminder may be sent, immediately, upon creation, so that the chosen digital capture device can store the reminder in associated device memory. Alternately, the reminder may be communicated at a predetermined time prior to the event or, repeatedly, at predetermined intervals to remind the user of the chosen capturing device that an event is imminent and will occur at some future time. The choice of when the reminder is communicated may be predefined within the application or the user may be able to define communication parameters when the reminder is created in the diary. If the chosen capturing device is remote from the device on which the planner application is implemented (i.e., the primary device), the chosen capturing device may store the reminder within a planner application and, if the event alert option has been identified, the event alert may be communicated, internally, from within the remote chosen capturing device (i.e., the need to communicate the alert from the primary device is obviated).

The event alert will be communicated to the capturing device proximate to the moment of the event. As previously, discussed proximate is defined as "at the moment of the event" or "shortly before the event occurs". Communication of the event alert may be from the primary device to an internal capturing device, from the primary device to a chosen remote capturing device or, as described above, internally, from within the chosen remote capturing in those instances in which the remote capturing device stores and executes a previously communicated event reminder.

In embodiments in which the event reminders or alerts are sent to external digital capture devices the reminders or alerts may be communicated by any form of wireless communication. For example, the devices may communicate by standard wireless telecommunications medium, wireless Internet or the like, or the devices may communicate via short-range connectivity functions, such as Bluetooth®, WLAN, RF tagging or the like. Communication may also take place in any form of wireline communication.

As such the present invention provides digital capture devices and/or digital communication devices with an efficient means of notifying the users of digital capture device that a media capture event is about to occur. Such notification and alert prevents or at least reduces the likelihood of a media capture event occurring without the event being captured or recorded.

FIG. 1 provides an example of a digital planner application that provides for digital display of a calendar view and media event reminders. The calendar view 100 provides for the entry of calendar events and the entry and implementation of media event reminders that are associated with specific calendar events. The planner application and, specifically, the calendar view will be generated by computer-readable program instructions implemented in association with a digital device. It is noted that the calendar view herein depicted and described is by way of example only; other calendar views that provide for the display of calendar events and media event reminders are also contemplated and within the inventive concepts herein disclosed. While the calendar view is typically associated with future time periods, future events and future reminders, it may also be possible for the calendar view to display past time periods, past events and past reminders.

The calendar view includes date columns 110, which correspond to a specific date. In the example shown, three date columns are visible on the display corresponding to the current date (i.e., Wednesday, 19 June) and the subsequent two dates. Typically, upon activation of the calendar view the current date will be displayed in the left-hand column of the calendar view with columns for the subsequent dates positioned sequentially to the right. As will be apparent, the calendar view may be differently oriented, such as with rows as opposed to columns or the current date may be displayed in the right hand column, if so desired. In an alternate embodiment the calendar view may include columns 110, which may correspond to any moment of time, such as year, month, day, hour or the like. Additionally upon activation of the calendar view the current moment of time may be displayed on the middle of the view.

The date columns 110 include multiple time blocks 120, which provide a descriptive area for information related to calendar events 130. In the embodiment shown, the time blocks correspond to one-hour time blocks, although the blocks may be for other lengths of time, such as 30-minute blocks. Further, for example if a column represents a year, the time block 120 may represent a month. The calendar view will be vertically scrollable, so that, all of the time blocks for a date column will be viewable by the user. In addition, the calendar view will typically be horizontally scrollable to provide for a view of other date or time columns 110. In addition, the time blocks may include reminder icons 140, which provide the media diary user a visual reminder related to an upcoming calendar event. For example in the depicted embodiment, the camera icon reminds the user that calendared event requires or will benefit from a having a camera on-hand.

In accordance with the present invention, the time blocks will include media event reminders 140, shown in the illustrated embodiment as camera icons that represent an image capture reminder. In addition the media event reminders may be illustrated as any icon, such as a camcorder for a video capture reminder or a microphone for an audio capture reminder. The media event reminders indicate that the user has designated this event as an event that warrants media capture. In addition to designating the event as an event warranting media capture, the media event reminder will provide for event reminders and/or alert(s) to be communicated to the designated media capture devices. The event alerts will serve as a reminder to the user of the device that the media capture event is imminent.

Typically, the user of the planner application can input calendar events or media events by activating the time block associated with the event date. Activating the time block will typically involve a keystroke or mouse-type function. Upon activation a supplemental event window will appear that allows the user to input information related to a calendar event and to designate the event as a media event. Designation of the calendar event as a media event will invoke the media event reminder to be displayed in the calendar view and, depending on pre-configuration or user preference, will warrant either an event reminder, an alert or both be queued for delivery to one or more media capture device(s) prior to the occurrence of the media event. In addition, in certain embodiments designation of an event as a media event will require the user to identify the media capture device(s) that will be sent event alerts when the event is imminent. As described above, in many embodiments the planner will be bonded to one specific media capture device and, in such instances, identifying media capture devices corresponding to a media event reminder is not required. In addition to manually inputting calendar events or media events, the planner application may import calendar events from other sources or applications that are being executed on the digital device or on an a remote digital device. A remote import case could be a calendar application or a media diary application in a remote digital device.

In one specific embodiment of the invention the digital planner application of the present invention is implemented in conjunction with a media diary application. The media diary application combines the digital planner, such as a calendar application, with a media storage and management application for the purpose of storing media files and insuring that the files can be easily and efficiently accessed. The media diary associates captured media files with a period of time, so that the user can manage media files according to a period of time. Typically, the period of time will be a specific date associated with a date that the media file was created or intended for. For example, if the media file is an image or video file of a birthday party, the media application may categorize and store the file according to the date of the birthday party. Additionally, the application provides the benefit of automatically associating the information related to a media event to a subsequently captured media file associated with the media event for the purpose of correlating the media event to the media file.

For a complete description of the media diary application see co-pending U.S. patent application Ser. No. 10/715,187, filed on Nov. 17, 2003, in the name of inventor Myka et al., and assigned to the same assignee as the present invention. That application is herein incorporated by reference as if set forth fully herein.

The media diary application may take the displayed form of a media view and calendar view combined with a timeline view. The calendar view, which is associated with the planner application, will display media event reminders, in accordance with the present invention.

The media diary application may be executed on any digital device that incorporates a media capture device or is capable of digital communication. In addition, the digital device that executes the media diary application will typically be associated with a display. Examples of such devices include a desktop or portable computer, cellular telephone, personal data assistant (PDA), set-top box (STB), PVR, DVR, TV, ebook device, digital camera, digital camcorder, digital audio device or the like.

In accordance with an embodiment of the present invention, the media diary application will be embodied by a computer-readable storage medium having computer-readable program instructions stored in the medium. Upon execution by a processing unit, the program instructions will implement the various functions of the media diary application as described below. The computer-readable program instructions will include first instructions that will generate a calendar view that represents time in calendar format and associates events with respective periods of time. The computer-readable program instructions also includes second instructions that will generate an event reminder that is displayed in the calendar view and provides for communication to the digital device of the event reminder prior to the event. Additionally, the computer-readable program instructions include third instructions that will generate a media view and a timeline view in unison with the display of the calendar view. The media diary application may also include instructions that correlate metadata in received digital media files with metadata in event reminders and/or calendar events. The media view provides access to digital media files and associates digital media files with a period of time and the timeline view provides scrollable access to digital media files in relation to periods of time and additionally to names of events or reminders.

FIG. 2 illustrates an example of a media diary application display 10 that provides a calendar view 100, a media view 200 and a timeline view 300, in accordance with an embodiment of the present invention. The calendar view is generated by the planner application and is similar in format and function to the calendar view described above.

The media view 200 portion of the media diary application display 10 provides for digital media files, such as digital images, digital video, digital text files or the like, to be accessible to the media diary user. Typically the media files that are represented in the media view will be associated to a past calendar event or past reminder. The media view will be generated by computer-readable program instructions implemented in association with a digital device. It is noted that the media view herein depicted and described is by way of example only; other media views that provide for the display of media file representations in association with a time period are also contemplated and within the inventive concepts herein disclosed.

The media view of the illustrated embodiment includes date columns 210, which correspond to a specific date, although the media view may be differently oriented if so desired. In the example shown, four date columns are visible on the display corresponding to the four previous dates. In an alternate embodiment the media view may include columns 210, which may correspond to any moment of time, such as a year, a month, a week, a day, an hour or the like. The date columns will include media file representations 220 that are related to media files and are connected, in time, to the specific date, event and/or time. For example, the media file representations may include representations that provide the user with access to digital files, such as video files, image files, audio files, text files, emails, short message service (SMS) messages, multimedia message service (MMS) messages and the like and provide the user with information pertaining to the content of the files. The media file representations may include an icon, or a thumbnail image, a portion of the text of a text document or message or any other suitable media file representation with or without a title of the media file. The media files will typically be stored in a memory unit that is either located within the device that implements the media diary or is in communication with the device that implements the media diary. In instances in which the media files are stored within a memory unit located on the digital device implementing the media diary, the memory unit may be the same entity that stores the media diary operating instructions.

Typically, the media diary will receive the media file from a digital recording function associated with the device or via digital communication from other devices. For example:

1) If the digital device is a cellular telephone that incorporates a digital camera or any other digital device that serves as a digital recording device, a digital media file (i.e., image) may be communicated directly via cellular telephone access from the camera/telephone device to the media diary in another device.

2) If the digital device is an independent digital camera or any other digital recording/storing/playing device and equipped with a wireless or wireline network connection the digital media file may be communicated directly from networked device to a media diary in another device.

3) If the digital device is an independent digital camera or any other digital recording/storing/playing device and equipped with short range digital communication means the digital media file may communicated first to a long range digital communication device (i.e. cellular telephone, a PDA, laptop or the like) that then passes the files to another device with a media diary. Alternatively, in proximity, a file transfer may occur directly to another device with a media diary.

4) The media files may be communicated by a physical memory unit/device transferred from one device to another device.

As such, the digital recording/storing/playing device from which the media file is communicated (i.e., the passing device) may include, and implement, the media diary application or may not include the media diary application. If the passing device includes the media diary application, the media files may be processed for media diary purposes prior to communication to other devices.

The communication/synchronization of the media files may be automatic after a creation of a new media file, or after a certain amount of media files have been created. Alternatively, the communication may occur at a selected time or on a request of a user and may include a single media file or a group of media files. The communication/synchronization may occur via any wireless or wireline network communication method, such as for example via SMS, MMS or file transfer. The communication, i.e. synchronization, may also occur from a back end media diary application/device to any digital recording/storing/playing device with or without the media diary application.

The media file will typically have associated metadata, in the form of a timestamp, event name, file name, location information, people in the event or in the media file, objects in the media file, file type, file size or the like. The media file metadata may be automatically inputted by the digital recording device at the time of the creation of the media file or may be manually inputted, such as at the time of creation of the media file or receipt or transfer of the media file. In addition, it is possible for the metadata to previously exist in conjunction with a calendar event in the media diary and to be associated with the digital media file at the moment the file is created, if the device creating the media file executes the media diary application.

Once the media diary receives the media file, the media file metadata is combined and/or correlated with the calendar event metadata information. The combined and/or correlated metadata information is associated and stored with the media file in the media diary, such that, when a user accesses the media file via the media file representation in the media view the user will be presented with the combined metadata and calendar event information. See for example, media file representations 220 of FIG. 2, in which, a thumbnail image is combined with a title and text entry. Additionally, media files forming or related to a specific joint group, e.g. based on a specific event or a time period, will be placed in the media view in a joint group 230 under a common title or subject. The title or subject may be manually inputted or may be inherited from metadata related to a calendar event or reminder, or, exclusively, from metadata related to the media file. The last option becomes relevant if the media file does not have a correspondence event or reminder in the associated calendar application.

The timeline view 300 will be generated by the computer-readable program instructions as implemented in association with a digital device. It is noted that the timeline view herein depicted and described is by way of example only; other configurations of timeline views that provide for the display of a timeline in combination with a media view and a calendar view are also contemplated and within the inventive concepts herein disclosed. The timeline view 300 of the illustrated embodiment provides for a time bar 310 and a media handle 320. The media handle can be deviated from the illustrated centerline position to provide for browsing of media files in relation to dates. The time bar provides for a hierarchal system for focusing in on dates and identifying dates that have associated media files.

A further embodiment of the invention is defined by a digital device that implements the event alert and reminder application, in accordance with an embodiment of the present invention. FIG. 3 illustrates a block diagram of digital device 500 that implements the event alert and reminder application and corresponding planner application. As previously noted, the digital device will typically be a digital device capable of digital communication with other digital devices that possess media capture capabilities or the digital device itself may possess media capture capabilities, such as a mobile terminal including for example, a mobile telephone equipped with a camera, a PDA, laptop computer or the like.

The digital device 500 will include a processing unit 510, such as a processor, an application specific integrated circuit, analog and/or digital circuitry, or any other similar device that executes computer-readable program instructions for accessing media files. Wherein the program instructions and the media files are generally stored in memory device 512. The computer-readable program instructions may include first instructions 520 for generating a calendar view that represents time in calendar format and associates events with respective periods of time, and second instructions 530 for generating an event reminder that is displayed in the calendar view and provides for communication to the digital device of the event reminder prior to the event and, optionally, third instructions 540 for generating a digital media diary that provides for digital display of a media view in unison with the display of the calendar view, wherein the media view provides access to digital media files and associates digital media files with a period of time. The media diary application may also include instructions that correlate metadata in received digital media files with metadata in event reminders and/or calendar events. In addition, the digital device will include a display 550 that is in communication with the processing unit and provides a presentation mechanism for the calendar view and the media view.

Additionally the invention is embodied in a methods for reminding and alerting a digital capture device of a media event warranting media capture. Referring to the flow diagram of FIG. 4, at step 600, a media event reminder is inputted in a planner application that is implemented on a digital device. The media event reminder signifies an upcoming an event that the inputting individual believes warrants media capture, such as image capture, video capture or the like.

At step 610, the media event reminder is associated with one or more digital media capture devices. Association of the event reminder with the one more digital media capture devices will dictate which devices are communicated event reminders prior to the occurrence of the event and/or event alerts at the time of the event. The association of the media event reminder to one or more digital media capture devices may occur, automatically, upon inputting the reminder in the planner application. Automatic association will occur if the planner is pre-configured as being associated or bonded with one or more digital capture devices. Typically, in the instance in which the planner application is implemented on a device with media capture functionality the planner application will be pre-configured as bonded to the internal capture device. In other instances, the user of the planner application may choose to associate the media event reminder with any one or more media capture devices.

At optional step 620, the media event reminder may be converted to metadata information related to the reminder. This step may be performed in those applications in which a media file will be created at the media event and will subsequently be stored in a media diary application that interfaces with the planner application. The conversion of the media event reminder will occur at the inception of the media event reminder. The need to convert the reminder to metadata information exists in those instances in which the planner application is used in a media diary application that stores and provides efficient access to media files.

Alternatively, the metadata conversion may happen in the planner application at the moment the event reminder is created and is communicated to the media capture device prior to the event. In this instance, the event reminder and related metadata are communicated simultaneously.

At step 630, an event reminder is communicated from the digital device to the one or more digital capture devices prior to the media event occurring. The communication may be internal to the device; as in those instances in which the planner application and the media capture device are implemented in the same physical unit. Alternately, the communication may external to the device; as in those instances in which the planner application has associated the media event reminder with a remote media capture device; such as an external camera capable of receiving wireless communication. In the embodiments in which wireless communication is implemented the communication medium may include wireless telecommunication networking, such as wireless Internet, short-range wireless connectivity or the like.

Alternatively at step 630, an event alert is communicated from the digital device to the one or more digital capture devices at the moment of the media event or immediately prior to the event, referred to herein as proximate the event. The communication may be internal to the device; as in those instances in which the planner application and the media capture device are implemented in the same physical unit. Alternately, the communication may external to the device; as in those instances in which the planner application has associated the media event reminder with a remote media capture device; such as an external camera capable of receiving wireless communication. In the embodiments in which wireless communication is implemented the communication medium telecommunication networking, such as wireless Internet, short-range wireless connectivity or the like.

At optional step 640, the moment of the alert may prompt automatic activation of the one or more media capture devices. Automatic activation may place the device in ready mode for capturing the event or automatic activation may begin the capture process without user activity occurring. The step 650 may also prompt a user to manually activate the media capture device.

At optional step 650, the metadata information that may have been created at step 620 is correlated with a captured media file associated with a media event. This step is typically performed in those instances in which the planner application is used in a media diary application that stores and provides efficient access to media files. Once the media file associated with the media event is communicated to a media diary application, the correlation process provides for the metadata information associated with the media event to be assigned to the media file and subsequently displayed, along with a representation of the media file, in a media view that a user employs to access the media files. For example, metadata associated with the event reminder relating to the media event may be assigned to the media file. Alternatively, if a media file with metadata information is communicated to a media diary application, the correlation process provides for the media file with metadata information to be assigned to a media view and subsequently displayed in a media view that a user employs to access the media files. In this alternate scenario, the media file with metadata information that is communicated to a media diary application, may also be assigned an event reminder that is subsequently displayed in the media view.

The described embodiments of the present invention provide for a notification system that reminds digital media capture devices that a media event that warrants capture is imminent. The notification system is implemented in conjunction with a digital planner such that event reminders are placed in the digital planner if a digital device and alerts are then sent to an associated digital media capture device prior to the occurrence of the media event. The alerts may be sent to internal digital media capture devices or the alerts may be sent to external digital media capture devices that are remote from the device on which the digital planner is implemented. Thus, the present invention eliminates, or lessens the likelihood, that media events will occur without the event being captured in some digital media form.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An application for communicating event reminders to a digital device, the application comprising a computer-readable storage medium having computer-readable program instructions embodied in the medium, the computer-readable program instructions comprising:
   first instructions for generating a calendar view that represents time in calendar format, and for associating events with respective periods of time; and
   second instructions for generating an event reminder that is displayed in the calendar view, and for providing communication of the event reminder to the digital device prior to the event wherein the digital device comprises a media capture device adapted to capture media from a location of the event.

2. The application of claim 1, wherein the second instructions further generates an event alert in response to instructions of the event reminder and communicates the event alert to the digital device at a time proximate the period of time associated with the event.

3. The application of claim 1, wherein the second instructions for generating an event reminder further includes instructions for the event reminder to be communicated, internally, to the digital device.

4. The application of claim 1, wherein the second instructions for generating an event reminder further includes instructions for the event reminder to be communicated, externally, to a remote digital device.

5. The application of claim 2, wherein the second instructions further generates an event alert further includes instructions for the event alert to be communicated, internally, to the digital device.

6. The application of claim 2, wherein the second instructions further generates an event alert further includes instructions for an event alert to be communicated, externally, to a remote digital device.

7. The application of claim 1, wherein the second instructions for generating an event reminder further includes instructions for generating an event reminder tat provides for a visual event reminder to be communicated to the digital device.

8. The application of claim 1, wherein the second instructions for generating an event reminder further includes instructions for generating an event reminder that provides for an audible event alert to be communicated to the digital device.

9. The application of claim 2, wherein the second instructions for generating an event alert further includes instructions for generating an event alert that provides for a visual event alert to be communicated to the digital device.

10. The application of claim 2, wherein the second instructions for generating an event alert further includes instructions for generating an event alert that provides for an audible event alert to be communicated to a media capture device.

11. The application of claim 1, further comprising third instructions for generating a digital media diary that provides for digital display of a media view in unison with the display of the calendar view, wherein the media view provides access to digital media files and associates digital media files with the period of time.

12. The application of claim 11, wherein the third instructions for generating a digital media diary further provides for digital display of a timeline view that provides for scrolling of the media view and calendar view in relation to time.

13. The apparatus of claim 1, wherein the second instructions provide communication of the event reminder to the media capture device comprising at least one of a camera, video recorder and audio recorder.

14. A digital device, the device comprising:
   a processing unit that executes computer-readable program instructions for accessing media files, the computer-readable program instructions comprising:
      first instructions for generating a calendar view that represents time in calendar format, and for associating events with respective periods of time, and
      second instructions for generating an event reminder that is displayed in the calendar view, and for providing communication of the event reminder to a digital media capture device prior to the event, the digital media capture device being adapted to capture media from a location of the event; and
   a display in communication with the processing unit that presents a display of the calendar view and media event reminder.

15. The digital device of claim 14, wherein the second instructions further generates an event alert in response to instructions of the event reminder and communicates the event alert to the digital device at a time proximate the period of time associated with the event.

16. The digital device of claim 14, wherein the digital device comprises the digital media capture device, and wherein the second instructions for generating an event reminder further includes instructions for the event reminder to be communicated, internally, to the digital media capture device.

17. The digital device of claim 14, wherein the second instructions for generating a media event reminder further includes instructions for the event reminder to be communicated, externally, to a remote digital media capture device.

18. The digital device of claim 15, wherein the digital device comprises the digital media capture device, and wherein the second instructions further generates an event alert further includes instructions for the event alert to be communicated, internally, to a the digital media capture device.

19. The digital device of claim 15, wherein the second instructions further generates an event alert further includes instructions for an event alert to be communicated, externally, to a remote digital media capture device.

20. The digital device of claim 14, wherein the second instructions for generating an event reminder further includes instructions for generating an event reminder that provides for a visual event reminder to be communicated to the digital media capture device.

21. The digital device of claim 14, wherein the second instructions for generating an event reminder further includes instructions for generating an event reminder that provides for an audible event alert to be communicated to the digital media capture device.

22. The digital device of claim 15, wherein the second instructions for generating an event alert further includes instructions for generating an event alert that provides for a visual event alert to be communicated to the digital media capture device.

23. The digital device of claim 15, wherein the second instructions for generating an event alert further includes instructions for generating an event alert that provides for an audible event alert to be communicated to the digital media capture device.

24. The digital device of claim 14, further comprising third instructions for generating a digital media diary that provides for digital display of a media view in unison with the display of the calendar view, wherein the media view provides access to digital media files and associates digital media files with the period of time.

25. The digital device of claim 14, wherein the third instructions for generating a digital media diary further provides for digital display of a timeline view that provides for scrolling of the media view and calendar view in relation to time.

26. The digital device of claim 14, wherein the second instructions provide communication of the event reminder to the media capture device comprising at least one of a camera, video recorder and audio recorder.

27. A method for alerting a digital capture device of an event warranting media capture, the method comprising the steps of:
inputting an event reminder in a planner application that is implemented on a digital apparatus;
associating the planner application with one of more digital media capture devices; and
communicating an event alert from the digital apparatus to the one or more digital media capture devices at a time proximate to the event occurring, at least one of the one or more digital media capture devices being adapted to capture media from a location of the event.

28. The method of claim 27, wherein the step of communicating an event alert from the digital apparatus to the one or more digital media capture devices at a time proximate to the event occurring further comprises communicating an event alert from the digital apparatus to an internal digital media capture device disposed within the digital apparatus prior to the event occurring.

29. The method of claim 27, wherein the step of communicating an event alert from the digital apparatus to the one or more digital media capture devices at a time proximate to the event occurring further comprises communicating an event alert from the digital apparatus to one more external digital media capture devices prior to the event occurring.

30. The method of claim 29, wherein the step of communicating an event alert from the digital apparatus to the one more external digital media capture devices at a time proximate to the event occurring further comprises communicating, via wireless telecommunication, an event alert from the digital apparatus to one more external digital media capture devices prior to the event occurring.

31. The method of claim 29, wherein the step of communicating an event alert from the digital apparatus to the one more external digital media capture devices prior to the event occurring further comprises communicating, via short-range wireless connectivity, an event alert from the digital apparatus to one more external digital media capture devices prior to the event occurring.

32. The method of claim 27, wherein the step of communicating an event alert from the digital apparatus to the one or more digital media capture devices prior to the event occurring further comprises communicating, repeatedly, an event alert from the digital apparatus to one or more digital media capture devices from a predetermined time prior to the media event up until the occurrence of the event.

33. The method of claim 27, further comprising the step of activating, automatically, the one or more digital capture devices upon receipt of the event alert.

34. The method of claim 27, further comprising the step of converting the event reminder to metadata information.

35. The method of claim 34, further comprising the step of correlating the metadata information with a media file associated with the event.

36. The method of claim 34, further comprising the step of associating the metadata information with a captured media file.

37. The method of claim 35, further comprising the step of presenting at least a portion of the metadata information and a representation of the media file in a media view associated with a media diary application.

38. The method of claim 27, wherein the step of communicating an event alert comprises communicating an event alert, from the digital apparatus to at least one digital media capture device comprising at least one of a camera, video recorder and audio recorder.

39. A method for reminding a digital capture device of an event warranting media capture, the method comprising the steps of:
inputting an event reminder in a planner application that is implemented on a digital apparatus;
associating the planner application with one of more digital media capture devices; and
communicating an event reminder from the digital apparatus to the one or more digital media capture devices prior to the event occurring, at least one of the one or more digital media capture devices being adapted to capture media from a location of the event.

40. The method of claim 39, wherein the step of communicating an event reminder from the digital apparatus to the one or more digital media capture devices prior to the event occurring further comprises communicating an event reminder from the digital apparatus to an internal digital media capture device disposed within the digital apparatus prior to the event occurring.

41. The method of claim 39, wherein the step of communicating an event reminder from the digital apparatus to the one or more digital media capture devices prior to the event occurring further comprises communicating an event reminder from the digital apparatus to one more external digital media capture devices prior to the event occurring.

42. The method of claim 41, wherein the step of communicating an event reminder from the digital apparatus to the one more external digital media capture devices prior to the event occurring further comprises communicating, via wireless telecommunication, an event reminder from the digital apparatus to one more external digital media capture devices prior to the event occurring.

43. The method of claim 41, wherein the step of communicating an event reminder from the digital apparatus to the one more external digital media capture devices prior to the event occurring further comprises communicating, via short-range wireless connectivity, an event reminder from the digital apparatus to one more external digital media capture devices prior to the event occurring.

44. The method of claim 39, wherein the step of communicating an event reminder from the digital apparatus to the one or more digital media capture devices prior to the event occurring further comprises communicating, repeatedly, an event reminder from the digital apparatus to one or more digital media capture devices from a predetermined time prior to the media event up until the occurrence of the event.

45. The method of claim 39, wherein the step of communicating an event reminder comprises communicating an event reminder from the digital apparatus to at least one digital media capture device comprising at least one of a camera, video recorder and audio recorder.

* * * * *

UNITED STATES PATENT AND TRADEMARK OFFICE
CERTIFICATE OF CORRECTION

| | |
|---|---|
| PATENT NO. | : 7,109,848 B2 |
| APPLICATION NO. | : 10/715094 |
| DATED | : September 19, 2006 |
| INVENTOR(S) | : Schybergson |

It is certified that error appears in the above-identified patent and that said Letters Patent is hereby corrected as shown below:

<u>Column 14,</u>

Line 13, "tat" should read --that--.

Signed and Sealed this

Sixth Day of March, 2007

JON W. DUDAS
*Director of the United States Patent and Trademark Office*